US006421317B1

(12) United States Patent
Denecheau et al.

(10) Patent No.: US 6,421,317 B1
(45) Date of Patent: Jul. 16, 2002

(54) METHOD AND APPARATUS FOR AN AUTOMATIC LOAD BALANCING AND BACK-UP OF A MULTI-USERS NETWORK

(75) Inventors: Lionel Denecheau; Denis Esteve, both of Vence; Christophe Fagiano, Mougins, all of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/161,930

(22) Filed: Sep. 28, 1998

(30) Foreign Application Priority Data

Nov. 7, 1997 (EP) .............................. 97480077

(51) Int. Cl.$^7$ ........................ G01R 31/08; H04L 12/56
(52) U.S. Cl. ...................... 370/222; 370/228; 370/404; 709/105
(58) Field of Search .................... 370/217, 221, 370/223, 224, 225, 227, 228, 242, 248, 229, 235, 351, 346, 403, 404–406, 450, 452, 460, 465; 714/717; 709/105, 227, 201, 310, 249, 226, 242

(56) References Cited

U.S. PATENT DOCUMENTS

| | | | | |
|---|---|---|---|---|
| 4,809,268 A | * | 2/1989 | Tejima et al. ................. 370/93 |
| 5,191,651 A | * | 3/1993 | Halim et al. ................. 395/200 |
| 5,606,693 A | * | 2/1997 | Nilsen et al. ............... 395/610 |
| 5,715,395 A | * | 2/1998 | Brabson et al. ......... 395/200.13 |
| 5,864,535 A | * | 1/1999 | Basilico ..................... 370/231 |

* cited by examiner

Primary Examiner—Alpus H. Hsu
Assistant Examiner—Duc Ho
(74) Attorney, Agent, or Firm—James A. Lucas; Driggs, Lucas, Brubaker & Hogg Co. LPA

(57) ABSTRACT

The invention aims to implement the Load Balancing/Backup function in a Multi-Users environment and to allow a remote station to have an alternate route through another Token Ring DLC to backup. By directing the connection to another route, it postpones the connection from a remote station to a Token Ring user through a first selected Token Ring DLC for a predetermined delay. For that purpose, each Token Ring DLC stores parameters of the remote station that has an unsuccessful connection in its own Connection Cache Table. In this way, when a Test frame is received in each DLC, this latter checks in the Connection Cache Table before responding to the Test frame. The Test frame is ignored and no Test response is sent back to the remote station when the remote station is identified in the table so as to allow the remote station to detect an alternate route with a backup DLC if it exists. Each Token Ring DLC manages its own Connection Cache table which contains an entry, a source MAC address and a Source SAP and a counter indicating the number of unsuccessful attempted Test frames received from that remote station. If the counter reaches a value N, then the entry corresponding to the remote station is removed from the table. Thus, the next time a Test frame is received from this remote station, it is accepted and a response is sent from the DLC. It gives a new opportunity to the remote station to establish a connection to the user in case this latter would become available again.

19 Claims, 9 Drawing Sheets

METHOD AND APPARATUS FOR AN AUTOMATIC LOAD BALANCING AND BACK-UP OF A MULTI-USERS NETWORK

FIELD OF THE INVENTION

The present invention relates to data processing in a multi-users communication network and more particularly to a Token Ring Automatic Load Balancing/Backup function in a multiple users environment.

BACKGROUND ART

The invention refers to Fe following terminology:

802.2 TEST frame: is an 802.2 Data Link Control (DLC) frame which is used for discovering a route toward a remote station.

XID frame: is an 802.2 DLC frame which is used for exchanging identification before establishing a connection.

SABME (Set Asynchronous Balanced Mode Extended) Frame: is an 802.2 DLC frame which is used for establishing a connection.

UA (Unnumbered Acknowledgment) Frame: is an 8022 DLC frame which is used for confirming a connection establishment.

Routing Information: is an 802.5 MAC Frame field containing the route which is used for a connection (list of ring numbers and bridge numbers).

Token Ring User: is the host computer that is shared and connected to a plurality of Token Ring stations.

MAC address: is the station address on the Token Ring.

Load Balancing function: enables to switch to another route when a route is overloaded.

Backup function: enables to back up a route which has become inoperative.

Resolve Procedure: enables to discover the route to the destination station by means of the Test frame.

SAP: Service Access Point used for identifying a user of the DLC 802.2. All Route Broadcast implement& the broadcast function that is used for copying the Test frame on all the rings.

The Automatic Load Balancing/Backup function is an improvement of the Token Ring Architecture. It allows an automatic balancing of the traffic between different Token Ring Adapters using the same MAC address, and also automatic backup in case one of the Token Ring adapter becomes unavailable.

The U.S. Pat. No. 5,493,689 describes a system for configuring an event driven interface including control blocks defining good loop locations in a memory which represent detection of a characteristic pattern. This technique is a combination of a source of control vectors which sends control vectors in a programmable performance vector generator which is coupled to a data communications network to be monitored and controlled. This invention enables real-time load distribution, load balancing, problem determination, routing and customer services, but it is to be implemented in environment that uses an expert system which analyzes the event vectors and provides monitoring information and control signals to the network.

The U.S. Pat. No. 5,606,693 and 5,668,986 which respectively relate to "A distributed database management over a network" and to "A method and apparatus for handling data storage requests in a distributed data base environment" are dedicated to a distributed database application for logging large volumes of data to a plurality of databases servers. A central configuration management is employed to balance the database load to direct requesting workstations to the appropriate database. Furthermore, this technique is to be implemented using workstations and database servers and configuration controllers connected to a dual network. In such an environment, a central configuration management and a dual network are unavoidable constraints.

Figure 1:
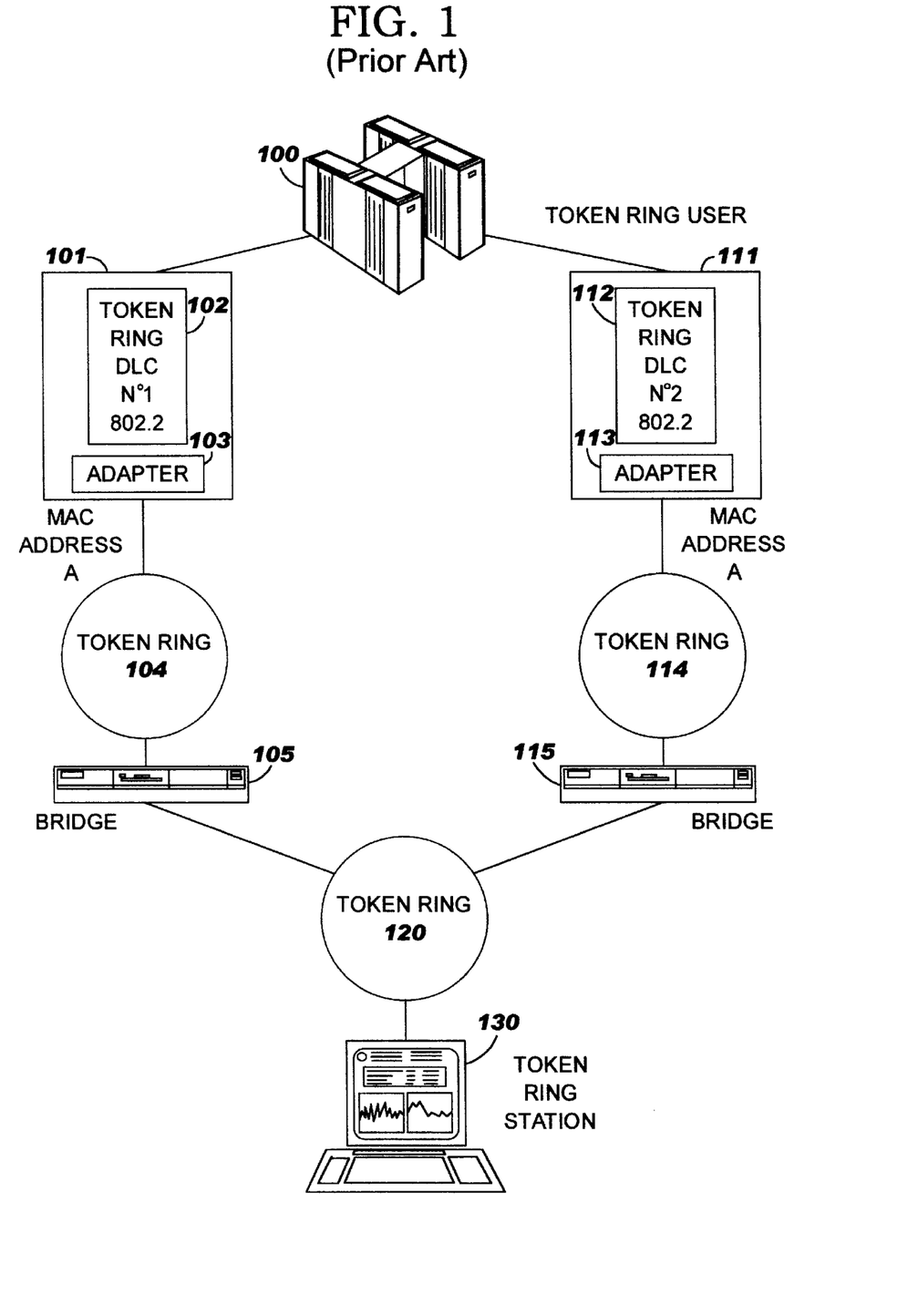
FIG. 1 describes the Automatic Load Balancing and Duplicate TIC address in a single user environment in the prior art.

FIG. 1 shows the different elements which are present in the Automatic Load Balancing/Backup Function.

The Token Ring User (100) activates 2 different Token Ring Data Link Control (DLC) (102 and 112) and 2 Token Ring Adapters (103 and 113), using the same MAC address, provided the Token Ring Adapters are connected to 2 separate rings (104 and 114).

When a remote Token Ring station (130) is to be connected to the Token Ring User (100), it uses the MAC address as its destination MAC address, and executes a Resolve Procedure to discover the route to the Destination. It first issues an All Route Broadcast Test frame assigned to the MAC address A.

Since the Test frame is sent in All Route Broadcast Mode, it is copied on Token Ring (104) by the bridge (105) and also on the Token Ring (114) by the bridge (115). As a consequence, both Token Ring adapters (103 and 113) receive a copy of the Test frame, and both respond. The Remote Token Ring Station (130) selects the first response and establishes the connection. This connection may be deselected in case it is overloaded or inoperative. Should the occasion arises, the second connection is established.

If the link between the Token Ring user (100) and one of the Token Ring DLCs (for example 102) gets overloaded, this Token Ring DLC (102) does not respond to the Resolve procedure and the connection is established via the other Token Ring DLC (112). This insures an automatic load balancing between the 2 Token Ring DLCs (102 and 112).

If the link between the Token Ring User (100) and one of the Token Ring DLCs (for example 102) gets inoperative, this latter (102) does no longer respond to the Resolve procedure, and the connection is established with the other DLC (112). This insures an automatic backup between the 2 Token Ring DLCs (102 and 112).

Figure 2:
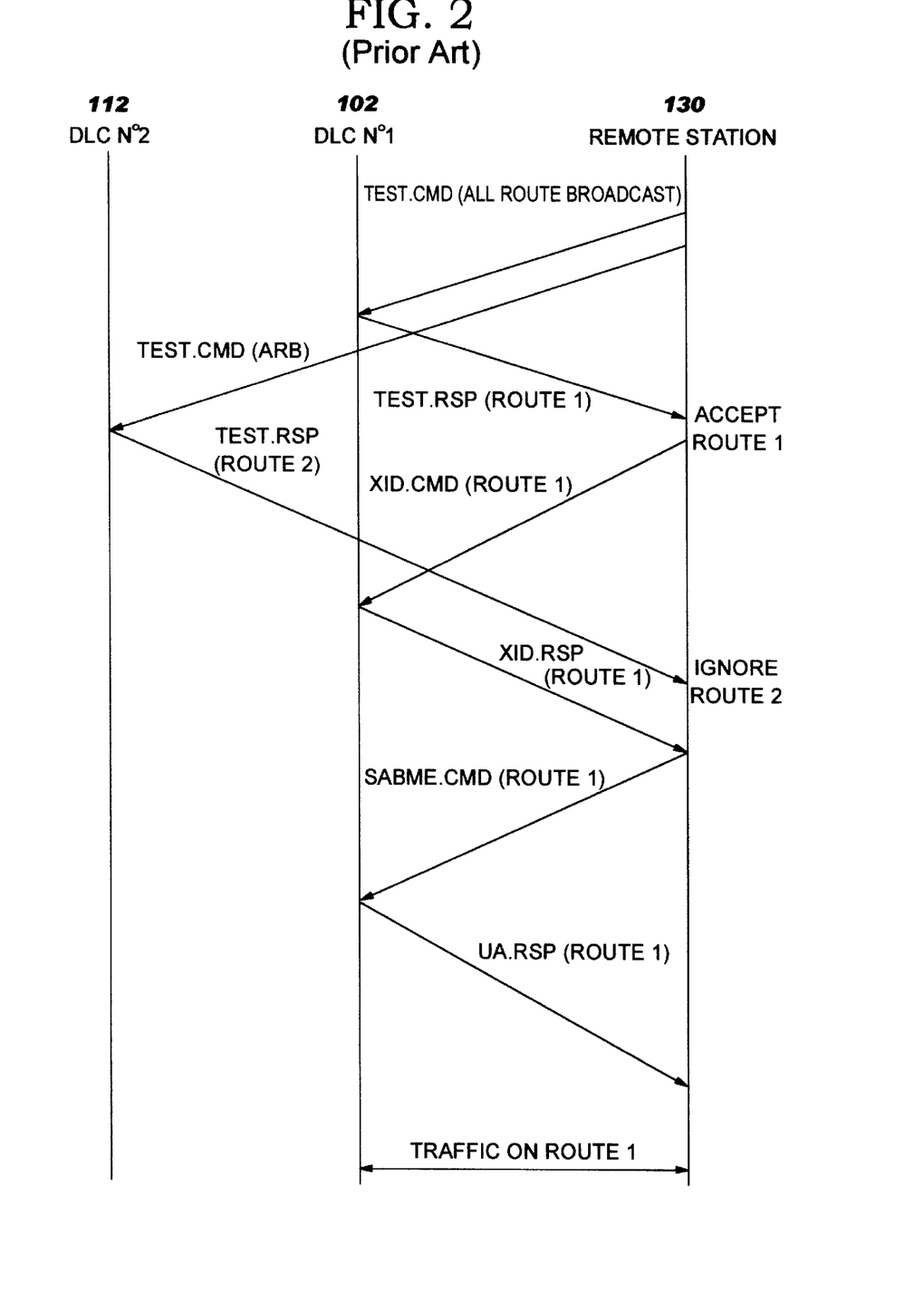
FIG. 2 scribes the Normal Flow of a single User Load Balancing in the prior art.

FIG. 2 shows the Normal Flow of Mono User Load Balancing.

The Remote Station (130) tries to connect to the Token Ring user (100). It first issues an All Route Broadcast Test frame assigned to the MAC address A and SAP 0. The Test frame is then received by DLC No 1 (102) and DLC No 2 (112).

When the DLC No 1 (102) receives the Test frame command, it checks whether a Token Ring user (100) is connected to the Token Ring Adapter (103). In such case, the DLC No 1 generates a response to the Test frame. This response contains the Routing Info field of route 1 that connects the Token Ring station (130) to the Token Ring user (100) through the Token Rings (120, 104, 102).

Conversely, when the DLC No 2 (112) receives the Test frame command, it also checks whether a Token Ring user (100) is connected to the Token Ring Adapter (113). Which is the case in this example. Thus, the Token Ring No 2 (112) responds to the Test frame and includes in its response the Routing Info field of route 2 that connects the Token Ring station (130) to the Token Ring user (100) through the Token Rings (120,114,112).

In our example, the Test response from DLC No 1 (102) is received first. The Remote Station (130) accepts the first Test frame response it receives, indicating the shortest path, and stores the corresponding route. This route will then be used for the transmission and reception of all frames for this connection between the remote station (130) and the Token Ring user (100).

In consequence, the Remote Station (130) ignores any additional Test frame response that would be received later on for this connection. The Test frame response from DLC No 2 (112) is ignored since it is received after the one from DLC No 1 (102).

Once the resolve procedure is completed, i.e. the Test frames are exchanged, the Remote Station (130) sends an XID frame to the DLC No 1 (102). The XID frame which contains the routing information of Route 1, is transmitted to the Token Ring user (100).

If DLC No 1 (102) receives an XID frame assigned to Token Ring user (100), it checks if this latter is active so as to report it the XID data. If the Token Ring user (100) accepts the connection, DLC No 1 (102) sends back an XID response to the Remote Station (130). This latter sends a SABME command to establish the connection with DLC No 1 (102) which responds with a UA response. The connection for the route 1 is then established and the data traffic can begin on this connection.

Figure 3:
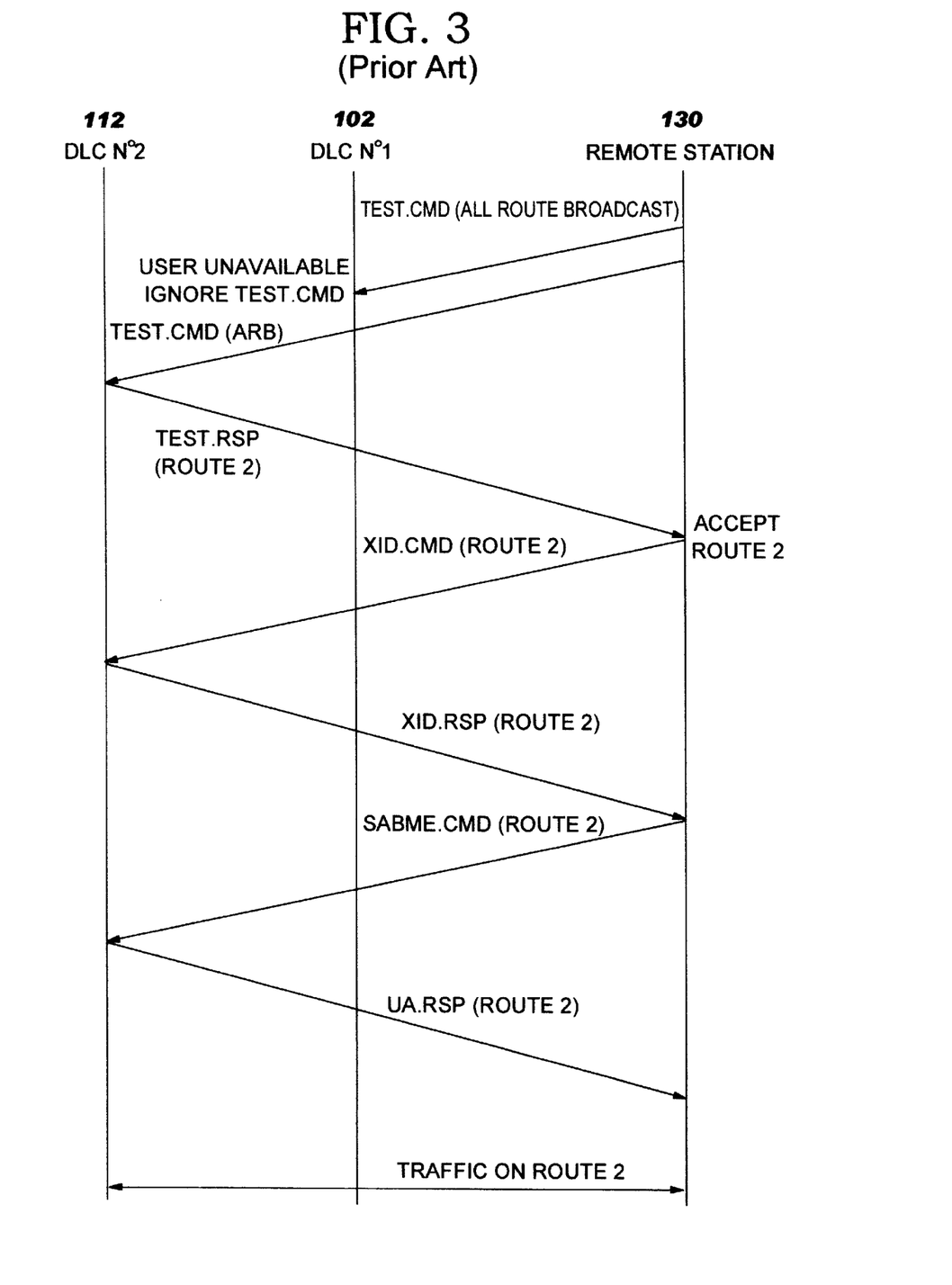
FIG. 3 describes the Normal flow of a single User Backup in the prior art.

FIG. 3 describes the Normal flow of a single User Backup.

In this example, the Token Ring user (100) is not available on DLC No 1 (102) but it is still available on DLC No 2 (112).

The remote station (130) sends a Test frame in the All Route Broadcast mode assigned to MAC Address A. The Test frame is then received by DLC No 1 (102) and DLC No 2 (112).

When DLC No 1 (102) receives the Test frame, it checks if the Token Ring user (100) is available. Since this latter is not available for DLC No 1, it does not respond to the Test frame.

On the contrary, when DLC No 2 (112) receives the Test frame, it checks if the application is available for DLC No 2 so as to send back a Test frame response containing the routing information of Route 2.

The Remote station (130) receives the Test frame response from DLC No 2 (112), and accepts it since it is received first. The routing information of Route 2 is stored and Route 2 will be used for the connection between the remote station (130) and the Token Ring user (100).

The remote station (130) sends an XID command to DLC No 2 (112), using this route 2. When DLC No 2 receives the XID command, it reports the XID data to the Token Ring user (100) which accepts the connection. DLC No 2 sends an XID response frame back to the Remote Station (130) on this route 2.

The remote station (130) sends a Set Asynchronous Balanced Mode Extended command (SABME) to Token Ring DLC No 2 (112), which responds with an unnumbered acknowledgment response (UA). The connection is now established between the remote station and the Token Ring DLC No 2. From now on data traffic flows on that connection.

Statement of Problem and Solution

Figure 4:
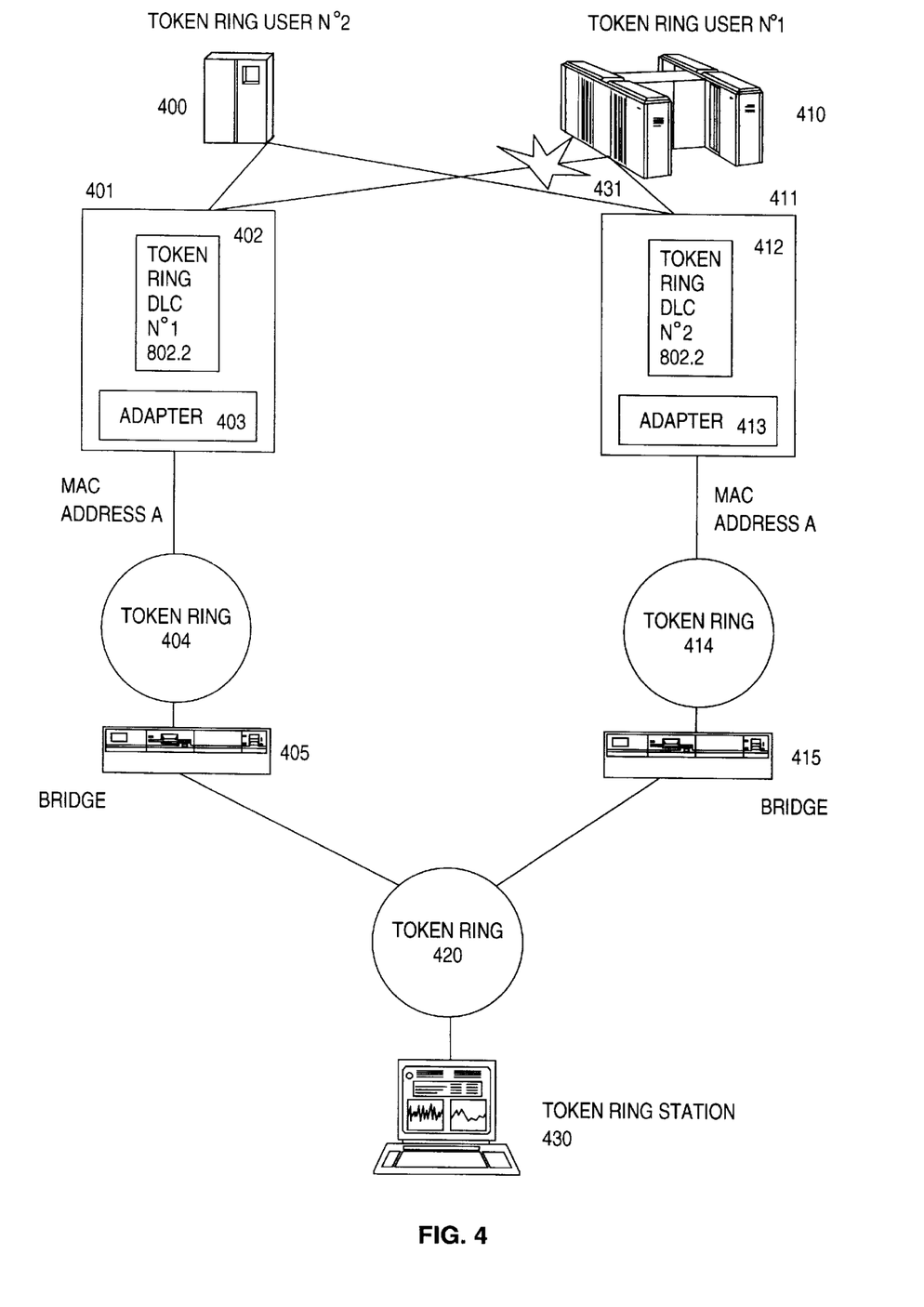
FIG. 4 describes the Multi User configuration and problems associated with it.

FIG. 4 describes the Multi User configuration which environment is almost the same as in FIG. 1, except that a Token Ring User No 2 (400) has been added.

Both users No 1 and No 2 (410 and 400) share both Token Ring DLC No 1 and No 2 (402 and 412) which are respectively connected to Token Ring Adapters (403) and (413). A Remote Station (430) is connected to each Token Ring User via 2 different routes. Route 1 is composed of Token Ring (420), Bridge (405) and Token Ring (404). Route 2 is composed of Token Ring (420), Bridge (415) and Token Ring (414). The numeral 431 indicates the path between DCL No 1 (402) is not available.

Figure 5:
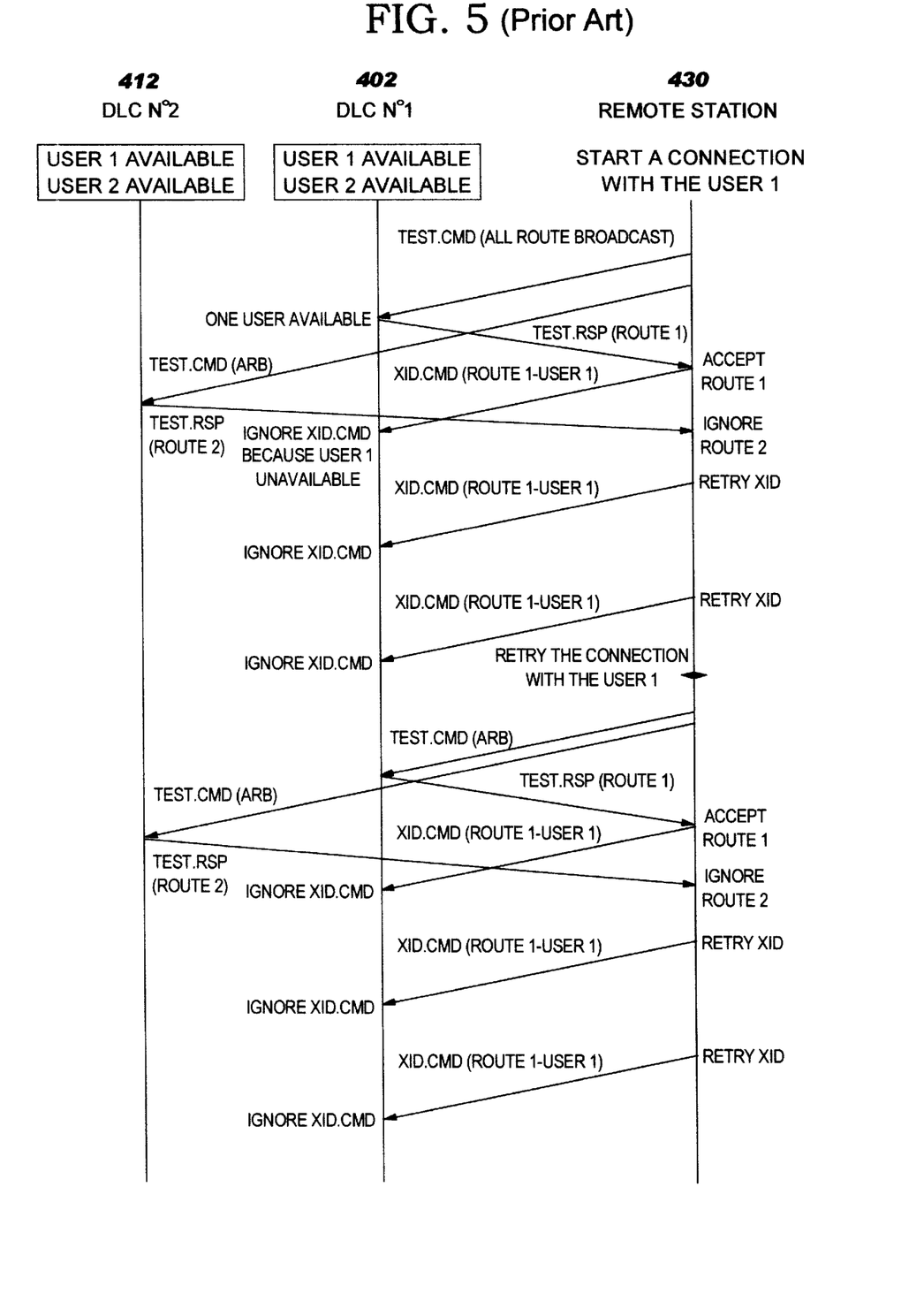
FIG. 5 describes the Flow of Multi User Load Backup.

FIG. 5 describes the Flow of Multi User Load Balancing/Backup without the implementation of the present invention. Remote station (430) tries to connect to Token Ring User 1 (410) which is not available for Token Ring DLC No 1 (402).

Remote station (430) sends a Test frame command in the All Route Broadcast mode, assigned to MAC Address A The Test frame is received by both Token Ring DLC No 1 (402) and No 2 (412).

Token Ring DLC No 1 (402) receives the Test frame command, said Test frame being assigned to SAP 0, which means there is no indication of destination user in Test frame. Since DLC No 1 has at least one Token Ring user (400) available (user No 2), DLC No 1 accepts the Test frame and sends back a Test frame response containing the Routing Information of route 1. The Remote station (430) receives this Test frame response as a first Test response for this connection. It accepts the Test frame response and stores this route 1.

When DLC No 2 (412) receives the Test frame command, it accepts the Test frame and sends back a Test frame response, containing the Routing Information of route 2.

The Remote Station (430) receives this second Test frame response. Since it has already received a Test frame response for this connection, the remote station ignores this additional test frame response.

The remote station (430) sends an XID to be transmitted to Token Ring user 1 (410) by using route 1 obtained from the first received Test frame response. DLC No 1 (402) receives the XID and it checks for which Token Ring user the XID is assigned owing to the SAP in the XID frame. DLC No 1 ignores the XID for Token Ring user 1, because this latter is unavailable.

The remote station (430) times out and retries sending XID frame for Token Ring user 1 (410) through DLC No 1 (402) which ignores them since Token Ring user 1 is not available on route 1.

After many failed attempts, the remote station (430) starts again with a new Test frame command. Since route 1 is shorter or has a better response time than route 2, DLC No 1 (402) is always the first to respond to the Test frame. Therefore, route 1 will always be selected and the connection between the remote station (430) and the Token Route user 1 (410) through the DLC No 1 (402) will always fail.

The problem is that the Test frame command contains a field SAP which is unfilled. Thus, the final destination cannot be determined at this stage and it is not possible to determine for which Token Ring user of the connection is available. On the contrary, XID frame contains the information of the final destination, i.e. which Token Ring user, but at that time, it is too late for DLC No 1. The reason of the problem is that the Token Ring DLC cannot determine from the Test frame the identification of the Token Ring user of the connection.

Besides, the DLC No 1 (402) is too fast to respond to the Test frame of the remote station (430) without taking into account the fact that Token Ring user No 1 (410) is unavailable through DLC No 1 (402). Whereas Token Ring User No 1 is available through DLC No 2 (412), but this latter does not respond to the Test frame earlier than DLC No 1.

The limitation of the Load Balancing/Backup function in Multi User environment is due to the fact that the resolve procedure Is directed to all Token Ring DLCs and not to a specific Token Ring DLC which is connected to an available Token Ring user.

Because of this multi-user environment, the link between one of the 2 Token Ring users and one Token Ring DLC may be overloaded while other links are not. In such case, the Token Ring DLC still responds to the resolve procedure since one of its links is not overloaded, and the automatic backup will fail. But if the Token Ring DLC were to ignore the Resolve Procedure because one of the links is overloaded, traffic to the Token Ring user No 1 and No 2 will be backed-up on me other Token Ring DLC. Such situation will interrupt all the connections if the link between Token Ring DLC 2 and user 2 were to be overloaded or inoperative.

OBJECT OF THE INVENTION

The object of the invention is to suppress this limitation of the Load Balancing/Backup function in a Multi-Users environment, by allowing a remote station to search for an alternate route through another Token Ring DLC to backup as soon as Token Ring user is unavailable through a previously selected Token Ring DLC.

It is another object of the invention to delay the connection from a remote station to a Token Ring user through a first selected Token Ring DLC for a predetermined delay.

The implementation of the automatic Load Balancing/Backup function also corresponds to the need in redundancy, backup and load balancing in their single protocol network.

Furthermore, the network evolution now leads to heterogeneous networks with different protocols, such as SNA (System Network Architecture), APPN (Advanced Peer to Peer Networking) or IP (Internet Protocol). It is therefore required to run these different protocols on the same adapters that are shared by a plurality of networks.

In addition, according to the present solution, it is possible to use the Token Ring Adapters for different network protocols and to implement the Load Balancing/Backup function.

SUMMARY OF THE INVENTION

According to the parent invention, the DLC memorizes the source MAC address and source SAP of the N remote stations for which an XID connection has been refused because of an unavailable Token Ring user. These MAC addresses and SAPs are stored in a Connection Cache Table. Each Token Ring DLC has its own Connection Cache Table.

When a Test frame is received, the Token Ring DLC checks in the Connection Cache Table before responding to the Test frame. If the Test frame has been sent from a remote station whose identification is already in the Connection Cache Table, it means this remote station has previously attempted to conned to an unavailable Token Ring User. In such case, the Test frame is ignored and no Test response is sent back to the remote station. This will allow the remote station to have a chance to detect an alternate route with a backup Token Ring DLC if it exists. Otherwise, the connection attempts will be directed to the same Token Ring DLC.

Each Token Ring DLC manages its own Connection Cache table contents. Each connection cache table entry contains, in addition to the source MAC address and the Source SAP, a counter indicating the number of unsuccessful attempted Test frames received from that remote station. When a Test frame is received and the source MAC address/Source SAP of that Test frame is found in the station cache table, the Test frame is ignored but the counter is incremented for that entry. If the counter reaches a predetermined value N, then the entry corresponding to the remote station is removed from the connection cache table. This means that the next time a Test frame is received from this remote station, it will be accepted and a response will be sent from the Token Ring DLC. It will give a new opportunity to the remote station to try to establish a connection to the Token Ring user in case this latter would become available again.

Thus, the method of load balancing and backing up a connection in communication network according to the present invention comprises the steps as are set in claim 1.

The apparatus in which the method of the present invention is implemented comprises the features that are set in claim 7.

DETAILED DESCRIPTION OF THE PRESENT INVENTION

This solution is applicable in the environment of Token Ring networks running multiple protocols, but could be extended to other 802.2 DLC such as bridged Frame Relay or ATM LAN Emulation etc Referring again to FIG. 4, the Token Ring user No 2 (400) and Token Ring user No 1 (410) are connected by Network Interface Card (NIC) 401 and NIC 411, respectively. The NICs are substantially identical. Therefore, the description of one is intended to cover the description of all. A functional representation of the NICs is shown in FIG. 4. The NIC is based on the IEEE-802 Committee implementation of the Open Systems Interconnection (OSI) module adopted by the International Standard Organization (ISO). The NIC includes the adaptor (403,413) which occupy the physical layer of the OSI model. The adapter includes all the necessary hardware and software to perform the functions described in the standards which are incorporated herein by reference. The hardware is well known in the art and further description is not warranted. Suffice it to say that the adapter may implement the Token Ring (802.5), ethernet (802.3), etc. In addition, the hardware may include connectors, conductive couplings, etc. the adapter includes a physical layer and devices for coupling to the network and to the Medium Access Control (MAC) layer functions coacting operatively with a Medium Access Controller to practice a desired network protocol. The Data Link Control (DLC) layer adjoins the adapter (physical layer). The (DLC) layer includes the Medium Access Control (MAC) layer and Logical Link Control (LLC) layer. The respective layers include the functions which are necessary to transport or route frames. The DLC further includes a memory storing information identifying remote stations and frequency with which a remote station is unable to connect with a selected resource in the network. A more detailed description of the respective layers and related hardware is set forth in the article entitled "*LAN IC's Let You Build Networks for PC's*" by Danny Corrnier, EDN, Dec. 11, 1986, (Page 136) and the IEEE related standards all of which are incorporated herein by reference.

Figure 6:
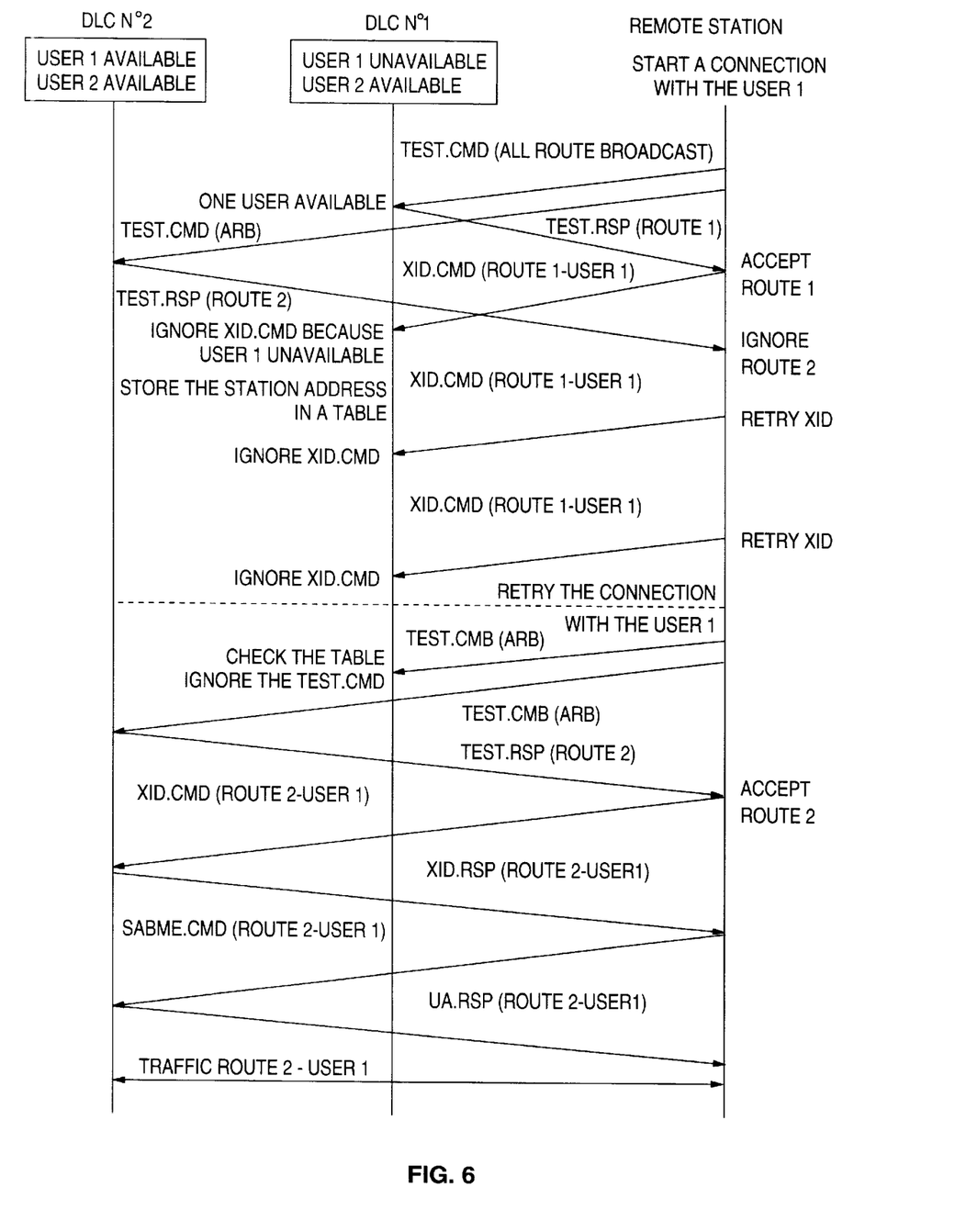
FIG. 6 describes the Flow of Multi-User Load Backup according to the present invention.

FIG. 6 describes the Flow of a Multi User Load Backup according to the present invention. This scenario differs from the previous one in that Token Ring DLC No 1 (402) keeps track of the connection failure in a Connection Cache Table.

When Token Ring DLC No 1 (402) receives an XID frame for Token Ring user 1 (410) which is not available for the Token Ring DLC No 1. This latter ignores the XID frame, but it stores the parameters of remote station in the Connection Cache Table. The parameters are the Remote MAC address and Remote SAP. Therefore, the next time a Test frame is received from this remote station, Token Ring DLC No 1 (402) finds its parameters in the Connection Cache Table and ignores the Test frame command.

Token Ring DLC No 2 (412) receives the Test frame command and sends a Test frame response containing the routing information of route 2 which connects the remote station to the Token Ring user 1 (410) through the Token Rings (420,414) and the Token Ring DLC No 2 (412). Since the remote station receives this Test frame response first, it stores this route 2. Furthermore, it sends an XID frame to Token Ring user 1 (410) by using this route 2.

Token Ring DLC No 2 (412) receives the XID frame assigned to Token Ring user 1 (401). It reports the XID frame to this latter. If Token Ring User 1 (410) accepts the connection, Token Ring DLC No 2 (412) sends back an XID response to me remote station (430).

Afterwards, the remote station (430) sends a SABME to DLC No 2 (412) in response of which this latter responds with a UA response. The connection is now established between the remote station (430) and DLC No 2 (412). From now on, data traffic can flow on this connection.

Figure 7:
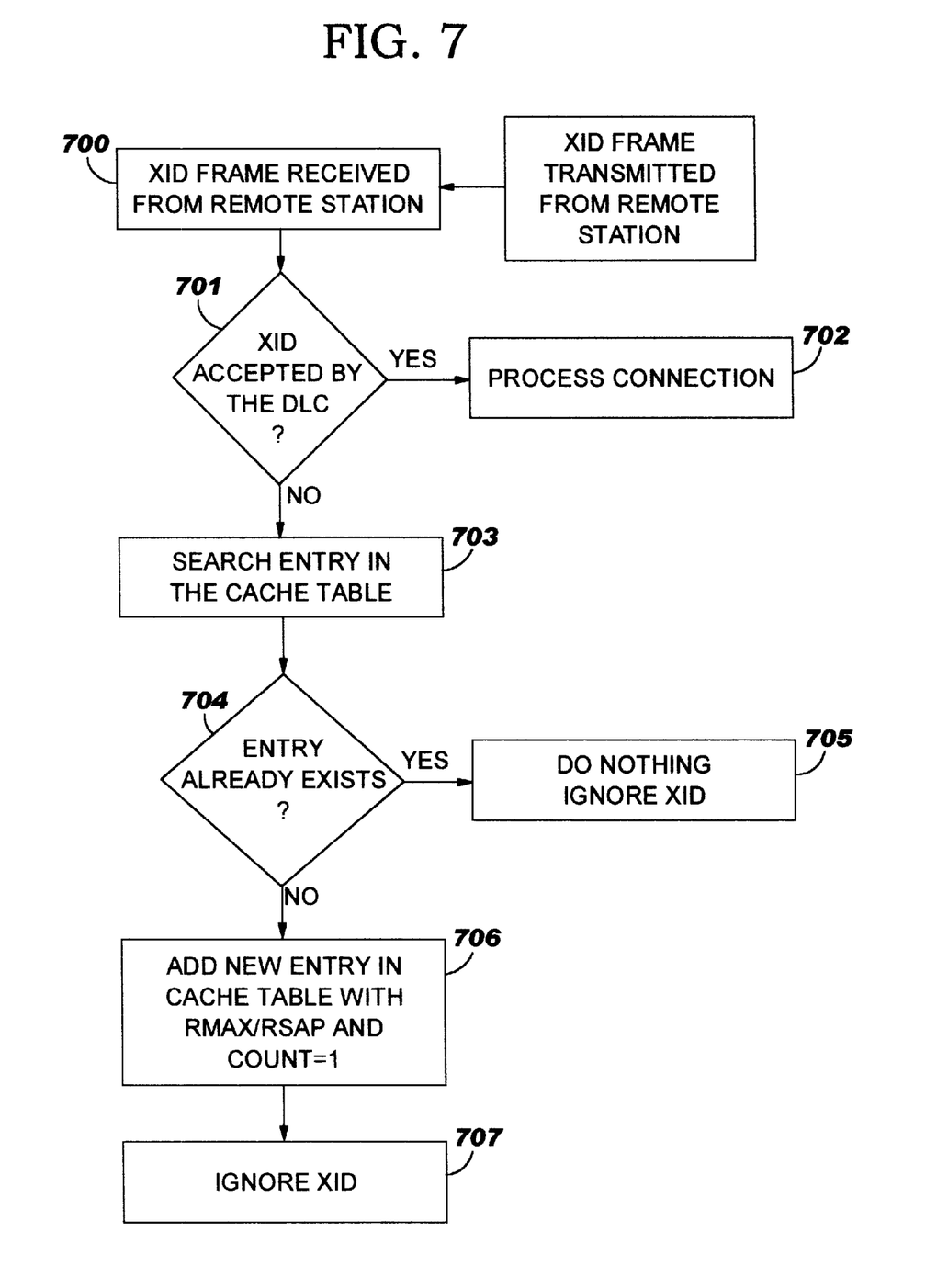
FIG. 7 describes the XID processing in a Token Ring DLC according to the present invention.

FIG. 7 describes the XID frame processing in a DLC whose Test response has been received first by the remote station. When an XID frame is received for an unavailable Token Ring user, DLC ignores the connection, but meanwhile, it adds a new entry in the Connection Cache Table and stores the station parameters.

The algorithm for the XID frame processing is as follows:

At step (700), an XID frame transmitted from a remote station is received by a Token Ring DLC. This latter checks in the destination SAP of the XID frame to determine if the Token Ring user associated to this SAP is available at step (701).

If the Token Ring user is available, then the connection is established at step (702). Otherwise at stop (703), the connection cannot be established and the DLC searches for the remote station in the Connection Cache Table. At step (704), the DLC tests if the entry is found in the Connection Cache Table.

If the remote station is already stored in the Connection Cache Table, DLC just ignores the XID frame at step (705).

Otherwise, at step (706) since the remote station for which the connection is being refused is not found in the Connection Cache Table, the DLC creates a new entry in the Connection Cache Table and stores the remote station parameters. Note that this last entry overwrites the oldest entry in the Cache Table. In addition, the count parameter is set to 1, indicating that one connection has been refused for that remote station.

The index of the Connection Cache Table is incremented, and if it reaches the bottom of the table, it wraps to the top of the table.

And finally at step (707), the DLC ignores the XID frame.

Figure 8:
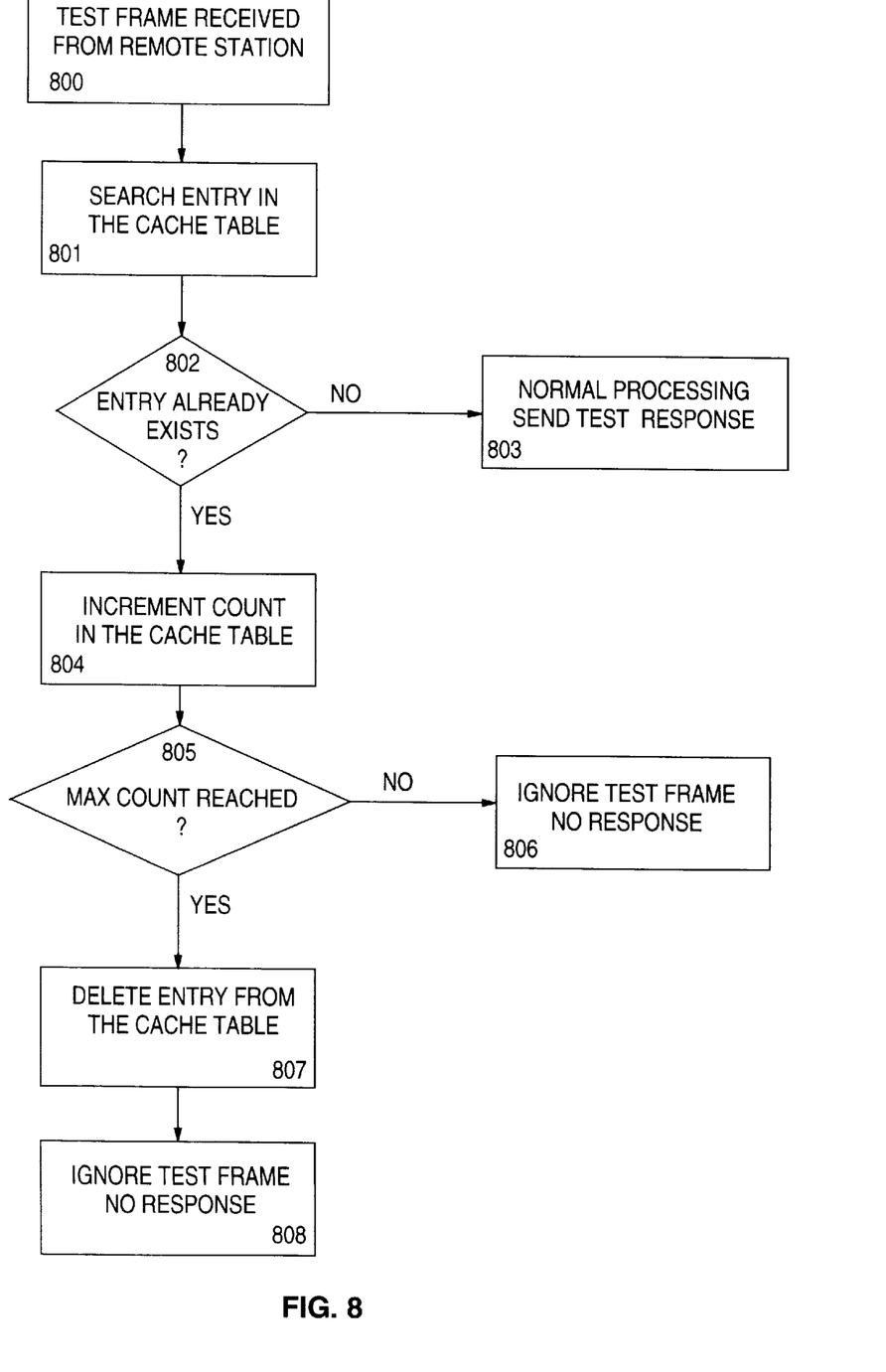
FIG. 8 describes the Test frame processing according to the present invention.

FIG. 8 describes the Test frame processing according to the present invention.

When a Test frame is received in an all broadcast mode, all Token Ring DLCs scan the Connection Cache Table to determine if a connection has previously been refused for the same remote station. Should the occasion arise in one of the Token Ring DLCs, it ignores the Test fame so as to give the opportunity for the remote station to obtain a backup connection to the Token Ring user.

The algorithm for the TEST frame processing is as follows:

At step (800), each DLC receives a Test frame sent from a Remote Station. Then, each DLC scans in the Connection Cache Table to determine if a connection has previously been refused for ma same remote station at step (801). It checks in the Connection Cache Table at step (802) if an entry of the remote station already exists.

At step (803), if the remote station is not found in the Connection Cache Table, the DLC processes the Test frame command and sends a Test frame response back to the Remote Station. Otherwise, at step (804), the DLC increments its own counter in the Cache table, indicating that an additional connection is being refused for that remote station.

Then, at step (805), the DLC checks if the counter has reached maximum value (N). If the maximum value (N) has not been reached, then the DLC ignores Fe Test frame at step (806). Otherwise, at step (807), the DLC deletes the corresponding entry in the Connection Cache Table. This means that the next Test frame received from that remote station will be processed and responded by this DLC.

And finally at step (808), DLC ignores the Test frame and does not respond.

Figure 9:
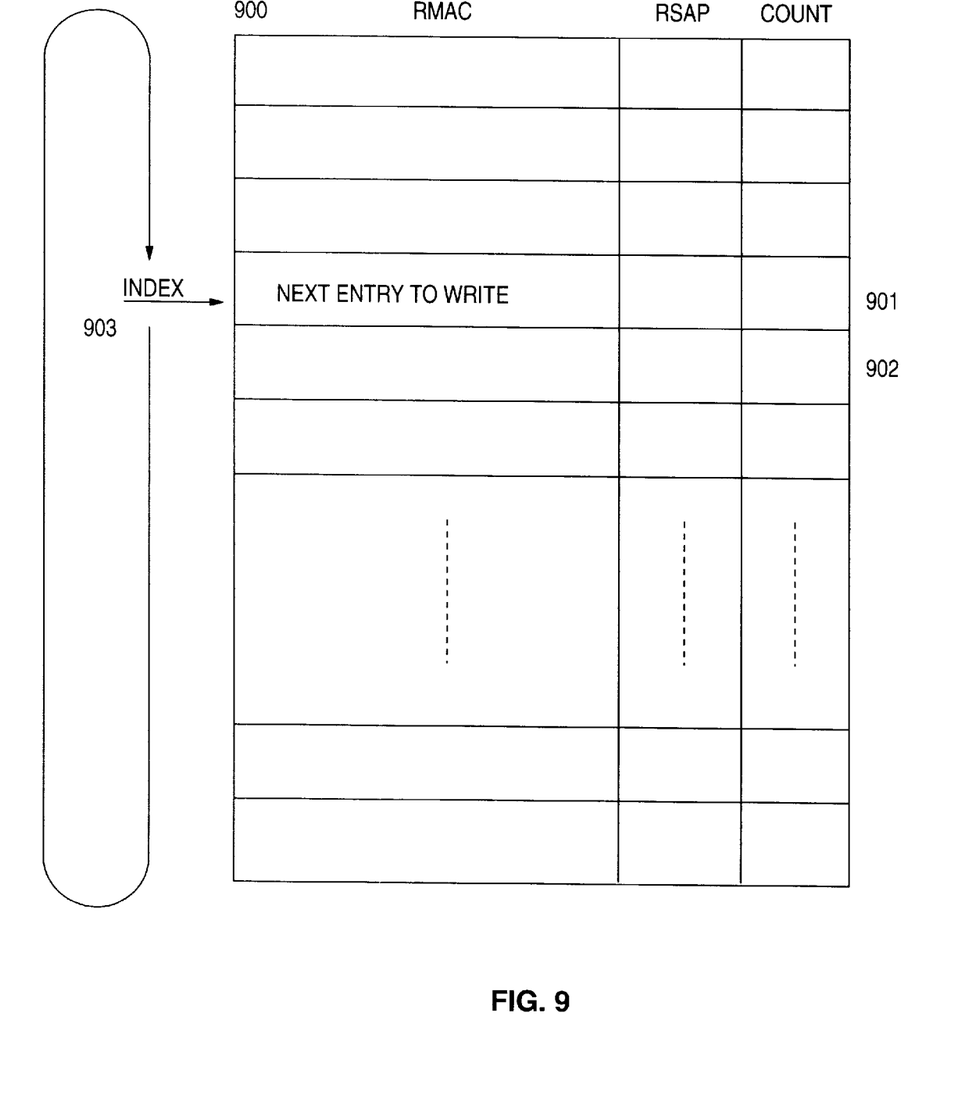
FIG. 9 describes the Connection Cache Table format according to the present invention.

FIG. 9 describes the content of the Connection Cache Table. The Connection Cache Table (900) contains the Remote Station MAC address and the Remote Station SAP. These parameters allows the DLC to identify the Remote Station. It also contains a connection Counter (count) indicating the number of unsuccessful connections of the remote station.

When a connection is refused for a remote station, a new entry (901) dedicated to this remote station is created in the Connection Cache Table. This new entry overwrite the oldest entry. Only a predetermined number M of the last unsuccessful connections are stored in the Connection Cache Table.

When a new entry is created, the Counter is set to 1. Then the index (903) is incremented and points toward the next entry (902). The Connection Cache Table wraps automatically when the bottom of the table is reached.

The connection cache table has a limited size (M entries). The number of entries must be sufficient to contain all the possible connections between the remote stations and a Token Ring user during a certain time. The best rational is to have M equal to the maximum number of connections between all the different remote stations and a user.

However, this table should not be too large because it has to be scanned whenever a Test frame is received, and a large table could impact on the performances. The connection cache Table has an index, pointing to the oldest entry in this table, once all the entries have been filled. Since this table has M entries, the index points back to the first position at the M+1 input. When a new connection is refused and the Source MAC address/Source SAP is not yet in the cache table, these new parameters are added in the connection cache table at the entry pointed by the index, and overwriting the oldest entry. The index is then incremented and wraps when the end of the table is reached. In this way, a new connection can be attempted to the destination user on the next Test frame received from said remote station.

In this document, in order to simplify the comprehension of the invention, a configuration of two Token Ring DLCs (routes) and two Token Ring users is described. But this invention is applicable in a more complex configuration with I Token Ring Remote Stations (130,430) connected to K Token Ring DLCs (402,412) with their associated Token Ring Adapters (403,413) through J Token Rings (404,414, 420) and L Token Ring users (400,410). This kind of configuration will not influence on the different processes of the present invention.

Furthermore, it should be kept in mind that though the description is based on the environment of Token Ring networks running multiple protocols, it could be extended to other 802.2 DLCs such as bridged Frame Relay or ATM LAN Emulation.

While the invention has been described in terms of preferred embodiments, those skilled in the art will recognize that the invention can be practiced with modification within the spirit and scope of the appended claims.

Having thus described our invention, what we claim is as follows:

1. A method for load balancing a connection request in a communication network connecting a plurality of remote stations (130,430) to a plurality of destination users (400, 410) through a plurality of networks (404,414,420) controlled by associated control means (402,412);

said method comprising the steps of:
   (a) transmitting (800) in an all broadcast mode a Test frame from a remote station (430) to connected control means (402,412) among which only available control means respond;
      (a1) searching (801) respectively in a connection table (900) associated with each control means (402,412) an entry identifying said remote station (430) so as to determine if a previous connection attempt has failed;
      (a2) ignoring (806,808) said test frame in said available control means (402,412) if a previous connection attempt has failed; otherwise, processing (803) a test response from said available control means (402,412); and
      (a3) upon reception of test responses from said available control means (402,412), transmitting (700) an XID frame from said remote station (430) to an available control means that has responded first
   (b) On reception of an XID frame in said available control means (402,414) ignoring (705,707) said XID frame when it contains an assigned destination user which is unavailable from said control means; and
   (c) when said assigned destination user is available from said available control means, establishing a connection between said remote station and said destination user.

2. The method of claim 1 further comprising the steps of:
   (b1) determining (701) from said XID frame if said destination user is available for said available control means (402,412);
   (b2) searching (703) for an entry in said associated connection table (900) for said remote station; and
   (b3) creating (706) a new entry for said remote station if it does by storing its parameter and setting its counter to 1 before ignoring (707) said XID frame.

3. The method of claim 2 wherein said step of creating (706) a new entry for said remote station whose connection is refused, includes overwriting new remote station parameters on an oldest entry so as to enable a connection attempt to the destination user on the next Test frame received from associated old remote station.

4. The method of claim 2 further comprising the step of:
   incrementing (804) a counter in said connection table (900) if an entry for said remote station exists and if said destination user (410) is still unavailable.

5. The method of claim 4 further comprising the steps of testing (805) the value of the counter in order to determine if it has reached a maximum value N; and
   deleting (807) the entry corresponding to said remote station (370) so as to enable a connection attempt to the destination user on the next Test frame received from said remote station.

6. A device for load balancing a connection request in a communication network connecting a plurality of remote stations (130,430) to a plurality of destination users (400, 410) through a plurality of networks (404,414,420) controlled by associated control means (402,412);
   said device comprising:
   (a) means (800) for transmitting in an all broadcast mode a Test frame from a remote station (430) to connected control means (402,412) among which only available control means respond;
   (b) means (705,707) for ignoring received XID frames in said available control means (402,412) when they contain an assigned destination user (410) which is unavailable from said control means (402); said means (705,707) for ignoring said XID frame further comprising a connection table (900), associated to each control means, having a plurality of entries, each entry being associated to a remote station and indicating if a previous connection attempt by said remote station (430) through said control means to a destination user has failed; and
   (c) means (702) for establishing a connection between said remote station (430) and said destination user (410) when said assigned destination user (410) is available from said available control means (412).

7. The device of claim 6 wherein each entry of said connection table (900) comprises a counter which determines the number of times said remote station (430) has unsuccessfully attempted to connect to said destination user by transmitting XID frames to said control means (402).

8. The device of claim 7 wherein each counter has a maximum value N above which said corresponding entry is deleted so as to enable a connection attempt to the destination user (410) on the next Test frame received from said remote station (430).

9. The device of claim 6 wherein said connection table is pointed by a rolling index having M entries so as to overwrite new remote station parameters on an oldest entry in order to enable a connection attempt to the destination user on the next Test frame received from associated old remote station.

10. In a communications network including a plurality of destination users, at least one remote station, a plurality of networks interconnecting the plurality of destination users and the at least one remote station and network interface cards (NIC) coupling respective ones of the destination users to respective ones of the plurality of networks, a method for load balancing a connection request including the steps of:

(a) receiving in said NICs a test frame with information seeking a route towards a destination user, from said at least one remote station;

(b) upon receiving an XID frame including identification information;

(c) examining the XID frame;

(d) it the XID frame contains an original destination user that is unavailable, said XID frame is ignored; and (e) if the XID frame contains an assigned destination user that is available from at least one of NICs establishing a connection between said remote station and said destination user.

11. The method of claim 10 further including the step of searching entries in each connection table associated with each NIC to determine if a previous connection attempt by said station has failed; and if the previous connection attempt by said station has not failed issuing a response frame including routing information to the remote station.

12. The method of claim 11 further including the step of terminating for this communication with said at least one remote station for a predetermined time interval if the previous connection attempt by said station has failed.

13. A network interface card(NIC) for use in a communications network including:

an adapter comprising a physical layer and including devices for coupling to the network and to the medium access control (MAC) layer functions coacting operatively with a medium access controller to practice a desired network protocol; and a data link control (DLC) layer including functions for routing frames, said DLC further including a memory storing information identifying remote stations and frequency with which a remote station is unable to connect with a selected resource in the network;

said medium access controller in response to a first predetermined frame searching the memory to determine if a station identified in the predetermined frame has been unable to connect with the selected resource; and issuing a response frame only if the station is not found in the memory.

14. The NIC of claim 13 further including the controller not issuing a response frame if the station was found in the memory.

15. The NIC of claim 13 wherein the memory includes a table having a section RMAC in which MAC addresses for stations are to be recorded, a section RSAP containing an indicia identifying a user and a section to record a count associated with each identifying entry in said table.

16. The NIC of claim 15 further including the controller in response to a second predetermined frame, make an entry in the table by writing a station MAC address in the second predetermined frame in the RMAC section of the table, the RSAP indication in the second predetermined frame in the RSAP section of the table and a logical "1" in the count section if this is the first entry for the station, otherwise increase the count by "1".

17. The NIC of claim 16 wherein the first predetermined frame includes an 802.2 test tame.

18. The NIC of claim 16 wherein the second predetermined frame includes an 802.2 XID Frame.

19. The NIC of claim 13 wherein the desired protocol includes token ring.

* * * * *